US008344878B2

(12) United States Patent
Goldman et al.

(10) Patent No.: US 8,344,878 B2
(45) Date of Patent: Jan. 1, 2013

(54) METHOD AND APPARATUS FOR THE CREATION OF AN EVENT-ASSOCIATED ELECTRONIC DEVICE DIRECTORY

(75) Inventors: Stuart O. Goldman, Scottsdale, AZ (US); Karl F. Rauscher, Emmaus, PA (US); Bernard Louis Malone, III, Little Rock, AR (US)

(73) Assignee: Alcatel Lucent, Paris (FR)

( * ) Notice: Subject to any disclaimer, the term of this patent is extended or adjusted under 35 U.S.C. 154(b) by 560 days.

(21) Appl. No.: 12/587,052

(22) Filed: Sep. 30, 2009

(65) Prior Publication Data

US 2011/0074572 A1  Mar. 31, 2011

(51) Int. Cl.
*G08B 1/08* (2006.01)
(52) U.S. Cl. ............... 340/539.13; 340/539.26; 340/5.6; 340/10.41; 340/13.26; 340/902; 340/903; 340/933; 340/944; 340/447; 340/572.1; 340/572.4
(58) Field of Classification Search ............. 340/539.13, 340/539.26, 5.6, 10.41, 13.26, 902, 903, 340/933, 944, 447, 572.1, 572.4
See application file for complete search history.

(56) References Cited

U.S. PATENT DOCUMENTS

| | | | | |
|---|---|---|---|---|
| 5,602,919 A | * | 2/1997 | Hurta et al. | 705/65 |
| 6,052,068 A | * | 4/2000 | Price R-W et al. | 340/933 |
| 2002/0038388 A1 | * | 3/2002 | Netter | 709/318 |
| 2005/0210267 A1 | * | 9/2005 | Sugano et al. | 713/186 |

* cited by examiner

*Primary Examiner* — Tai T Nguyen
(74) *Attorney, Agent, or Firm* — Hitt Gaines, PC

(57) ABSTRACT

A manner of creating an electronic device directory containing the identity of electronic devices that registered in an area associated with a plurality of events, which events are similar in certain respects. The directory is useful, for example, investigating criminal cases. When such an event occurs, an application server is notified and generates one or more device registration capture requests to determine which electronic devices are registered in the area and at approximately the same time at which the event occurs. The device registration capture associated with this event is compared with other device registration captures associated with other, similar events to create the electronic device directory. The electronic device directory entries are preferable filtered to select the devices most likely to be associated with the actual events in question.

14 Claims, 3 Drawing Sheets

METHOD AND APPARATUS FOR THE CREATION OF AN EVENT-ASSOCIATED ELECTRONIC DEVICE DIRECTORY

TECHNICAL FIELD

The present invention relates generally to the field of communication networks, and, more particularly, to a method and apparatus for creating a directory of electronic devices identifying persons who were or may have been in a given area when criminal activity or other events have occurred.

BACKGROUND

The catching of criminals and finding other persons of interest can be difficult in modern circumstances. Unless a perpetrator is apprehended at the scene of a crime in front of witnesses, for example, he or she can quickly become hard to identify and even harder to find. Two factors contributing to this difficulty are population density and mobility. With so many people living in a relatively small geographic area, a person who commits a crime can quickly blend into the general population and almost disappear. In addition, the ability of one person to move quickly from one place to another—even a distant—location has increased dramatically. As a result, the perpetrator can both flee the scene quickly and soon strike again in a different jurisdiction.

Needless to say, agencies such as local, state, and federal law enforcement can use all the assistance modern technology is able to provide. They can of course take advantage of rapid transportation themselves, but are frequently bound to stay within a single jurisdiction. Communication methods have also improved, but each agency still needs something in the way of information to communicate to another agency that will further the effort to identify, locate, and capture the wanted suspect.

One technological aid that has proven useful to law enforcement is the surveillance video camera. As video cameras have become relatively inexpensive, they have become almost ubiquitous in some locales. The technology associated with collecting and storing the captured images has also improved, so a continuous video record can be preserved for quite some time. Video cameras can even be installed in hidden and inaccessible locations, so detecting them and frustrating their operation can be a challenge. Naturally, video cameras are often placed in locations where undesirable behavior is a strong possibility, such as in back of or near the entrance to retail outlets. Many individuals also use video surveillance in their homes.

For this reason when a crime, terrorist attack, or other undesirable activity occurs, law enforcement agencies often canvass the area to determine of a video image related to the event can be found. Most useful, of course, is a video capturing the image of persons in the area at the time. If the image of any given subject is sufficient for purposes of identification, the then known whereabouts and movement of the subject can be used for the investigation. If the person identified is a known criminal, for example, an attempt may be made to see if other evidence relates them to the event in question. The identified person may even be contacted and interviewed, if possible. By the same token, the presence of an individual in the vicinity of a number of similar events might raise suspicion as well.

Unfortunately, video surveillance as an enforcement tool has its limitations. Even where there are many cameras, they each have a limited field of vision and can only capture so much. Frequently, cameras are deployed to cover a specific area and even people passing by this area are recorded imperfectly. Even when in view, a person may be turned the wrong way or wearing, for example, a hat and dark glasses that make identification difficult if not impossible. Many criminals, of course, dress themselves in such a manner so as to purposely make it hard for an eyewitness—either live or by videotape—to later identify them. Another obstacle may be the sheer volume of video evidence that may be available. Hours of video may have to be viewed in order to make even a small amount of progress in an investigation. While some automated recognition techniques may be used, these also suffer from the disabilities associated with incomplete images and intentional efforts to frustrate witnesses.

There is a continuing need, therefore, for a way to investigate which persons might have been present at or near the scene of an event to determine whether their activities might be considered suspect.

SUMMARY

The present invention is directed to a manner of creating an electronic device directory containing the identity of electronic devices, such as cell phones, mobile phones, PDAs, portable computers, and so forth that registered in an area associated with a plurality of events, which events are similar in certain respects and may be related.

In one aspect, the present invention is a method of creating an electronic device directory, including detecting, at an application server, the occurrence of a first event, comparing, in the application server, a first device registration capture associated with the first event with at least one device registration capture associated with a previous event to identify common electronic device registrations, and generating an electronic device directory including at least selected ones of the common electronic device registrations. The device registration captures may be generated in response to a request from the application server, which may specify a particular area of interest, or it may be from a previous request by another server. The electronic registry device may be used, for example, in pursuit of the perpetrators of a criminal event such as a bank robbery. The electronic device directory is preferably created using comparisons of device registration captures associated with similar events, and so the method also may include comparing two or more events in order to select ones that are similar as candidates for analysis. The distance separating two similar events may be taken into comparison when selecting candidates for comparative analysis, as electronic devices belonging, for example, to residents of the area are likely to appear in many device registration captures, and the resulting electronic device directory is consequently of little use for investigation. In other embodiments, however, the method also includes the step of filtering out electronic devices known to belong to residents, or those frequently found in the area irrespective of the occurrence of an event. The latter category may be discovered, for example, by requesting periodic device registration captures at various times during the day and week.

In another aspect, the present invention is an apparatus for creating an electronic device directory, including a device registration capture request generator for generating a request for transmission to a communication network to store the identity of electronic devices registered with the network, an electronic device directory generator for generating a directory of electronic devices found to have been registered in the area of each of a plurality of events and at or near the time when the event occurred. A controller is present for supervising operation of these components, as is a memory storage device for storing operating instructions and data. The apparatus, which may be an application server under the control of an investigative authority, may also include a device registration capture comparator for comparing two or more device registration captures to determine which electronic devices, if any, are reported as being registered on a plurality of the device registration captures. It may also include an event comparator to compare characteristics associated with one event with characteristics associates with at least one other event and to select candidate events for device registration capture comparison.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed at a manner of building an electronic device directory for use, for example, by an investigative agency attempting to locate persons who were in the vicinity of an event, such as an act of crime, and who may have a relatively-higher probability of being implicated as perpetrators.

In some embodiments, the present invention builds the electronic device directory by, at least in part, comparing two or more device registration captures. As will be explained in more detail below, this allows the investigative authority to determine which electronic devices were in a given area at a given time. They can use this information in the course of their investigation.

Figure 1:
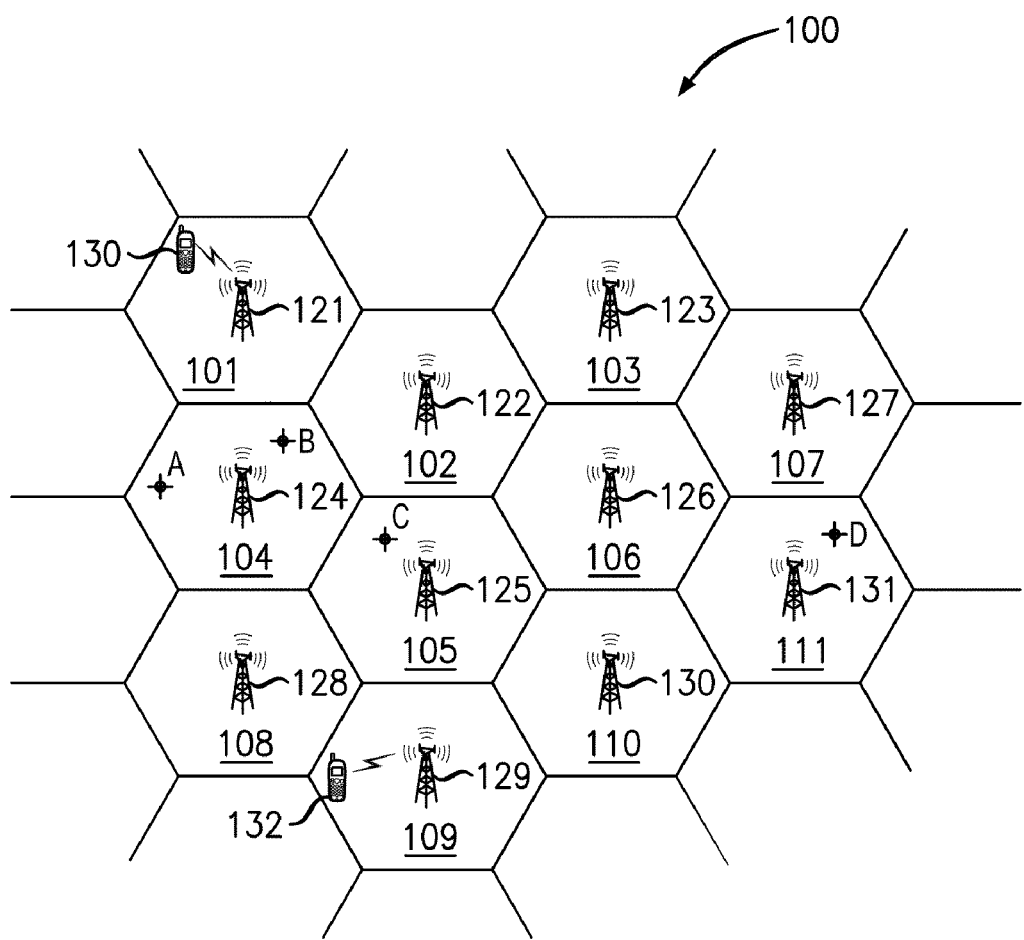
FIG. 1 is a simplified block diagram illustrating selected components of a cellular telephone network.

One highly relevant example involves one or more cellular telephone networks. The use of such a network is explained beginning with reference to FIG. 1. FIG. 1 is a simplified block diagram illustrating selected components of a cellular telephone network 100. In FIG. 1, the most notable feature of network 100 is that it is divided into a number of geographic areas, called cells. Cells 101 through 111 are illustrated in FIG. 1, and they are bordered by portions of other cells not referred to specifically. Only a portion of network 100 is illustrated in FIG. 1; most such networks are larger and have many more cells.

Cellular networks are divided in this manner to support a larger number of cellular telephones (often referred to simply as cell phones or mobile phones). Each cell phone includes a radio frequency transmitter and receiver (sometimes more than one). Cell phones do not call each other directly, however, but contact a nearby base station via its associated antenna. Base stations 121 though 131 are shown in FIG. 1. In this way frequency channels can be re-used in sufficiently geographically separated cells and more cell phones can be used throughout the network as a whole. For example, in FIG. 1, cell phones 130 and 132 are illustrated as communicating with base stations 121 and 129, respectively.

Cells may vary in size from several miles across to less than one mile, usually depending on population density or local limitations on transmission range. Cells do not, however, define an outer limit on transmission range; a cell phone that is physically in one cell may actually be able to communicate with two or more base stations in adjacent cells, and procedures are in place for selecting the optimum base station for a communication session. Since cell phone are usually mobile, procedures are also put in place so that communication involving one base station may be handed over to another if the communicating cell phone moves from one cell to an adjacent cell.

To initiate a call, the cell phone can simply send out a request that will be picked up by an in-range base station so that the communication session can begin. The base station is itself connected, usually by a cable or other means, to the cellular network infrastructure so that the call may be routed appropriately. To receive a call, however, the cellular network must know where the cell phone is when the call is being set up. For this reason, cell phones periodically send out a registration signal to alert nearby base stations to their presence in the cell. The cell location associated with a base station receiving the cell phone registration signal is then stored in a database accessible to the network so that any calls to the cell phone can be properly terminated. Naturally, this information must be updated when the cell phone relocates and, in many cases, is eventually deleted if the cell phone fails to register again after a certain period of time.

The present invention takes advantage of this property of cellular networks, sometimes referred to as auto-registration. That is, the cell phone registers automatically when it is turned on and periodically thereafter, even if the subscriber does not initiate any telephone calls, send any text messages, or otherwise begin a communication session involving the network.

Here is it noted that other types of communication networks involving potentially mobile users may use also be aware of the location of certain devices. For example, portable computing devices such as laptops, two-way pagers, gaming devices, and so forth, may communicate with their networks in such a manner as to have their current location temporarily recorded in a database. The present invention may also take advantage of this information to the extent it is available. For convenience, the process of accumulating this information will be referred to as registration, regardless of how it specifically is accomplished.

Figure 2:
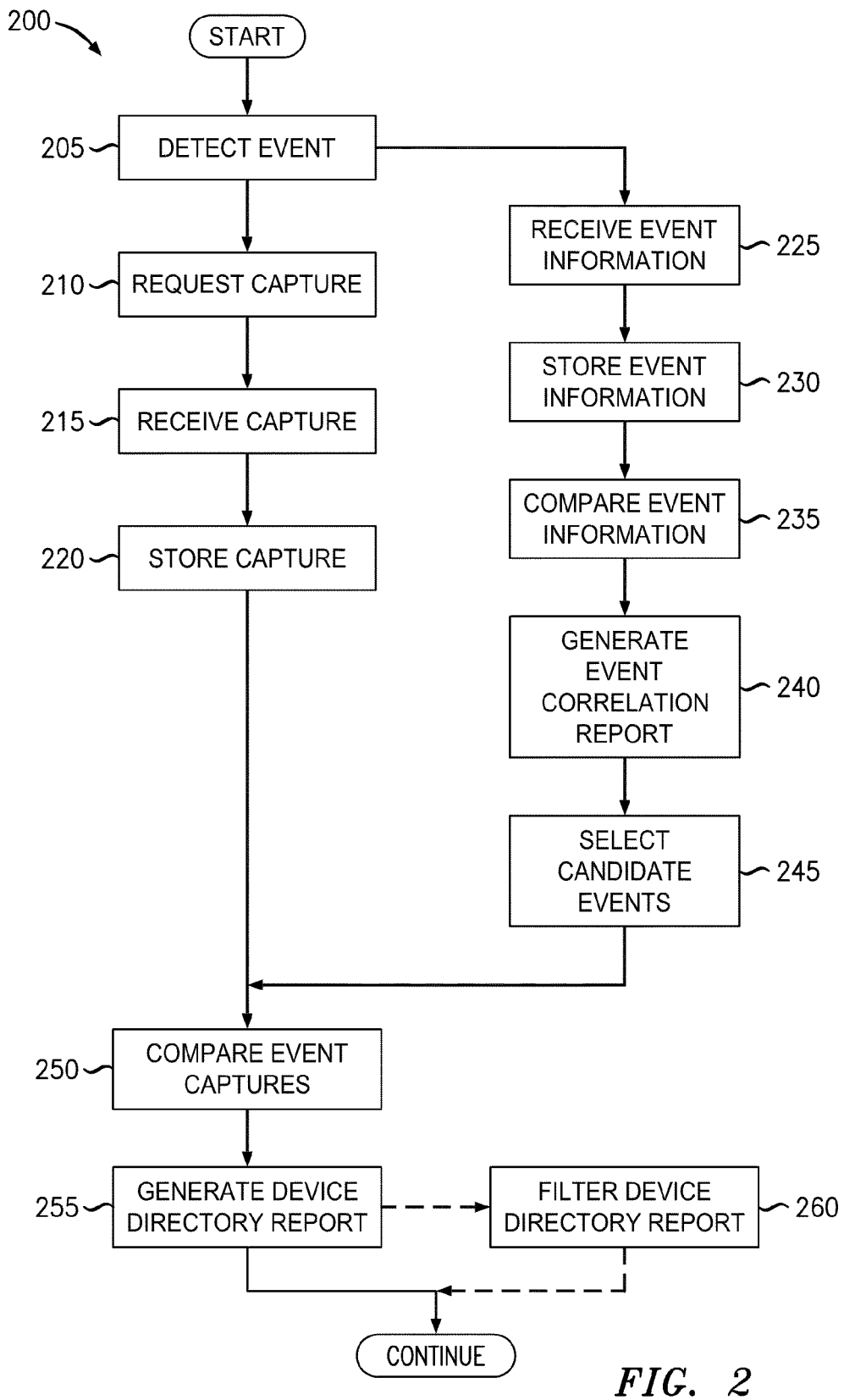
FIG. 2 is a flow diagram illustrating a method according to one embodiment of the present invention.

FIG. 2 is a flow diagram illustrating a method 200 according to one embodiment of the present invention. At START it is presumed that the components necessary for execution of the method are available and operational. The process then begins with the detection of an event (step 205). For the purposes of illustration the event will be exemplified as a bank robbery, although the method 200 may be applied to other types of events as well. In most implementations, the detection step involves learning the location and basic nature of the event.

The event may be detected in a number of ways, either manual or automatic. A bank teller, of course, knows when a robbery is underway, and the police are eventually informed by a telephone call, activated alarm system, or similar alert. The detection step 205, however, occurs when the apparatus of the present invention (see, for example, FIG. 3) is activated. A police or bank official may, for instance, flip a switch, press a button, or enter a command that directly or indirectly signals that the process 200 should continue. In other implementations, an automated alarm system that alerts the police of the robbery automatically activates the apparatus. In this case, it may be desirable to provide notice to a user that the system has been activated or to request confirmation that it should be activated. Where a confirmation request is generated (not shown), the system may wait for confirmation, or proceed through the process if no command from the user is received within a certain time period.

In any case, when the system detects an event, a request is transmitted (step 210) that a device registration capture be executed. As mentioned above, cellular telephones periodically register with the cellular telephone network so that the network knows which base station and cell sector antenna will be used to terminate a call directed to the cellular subscriber. Other communication networks may use auto-registration or another method to locate their users. When such a device-registration capture request is transmitted, of course, it is with the expectation that at least some of the various network operators or other recipients of the message will comply. In some cases, they may be compelled to do so as a condition of their license. In any case, what will be gathered by compliant network operators is a listing of all cell phones or other devices that registered (in the broad sense) with the network prior to the capture and have not yet been removed from the registry database.

Where, as would usually be the case, more than one network provider has coverage over the area where the event takes place, a device registration capture request may be sent to each of them. In some embodiments (not shown in FIG. 2) a database of carriers and their coverage areas is maintained by the investigative authority and can be consulted to determine where the requests should be directed.

Again, removal from the registry may take place when the mobile device has registered elsewhere, has been moved out of the particular cell it was registered in, or after a certain amount of time has elapsed since their previous registration. It is, however, those devices that registered prior to and relatively-close in time to the event that are of most interest. In some embodiments, a single "snapshot" of time may be used, while in others the capture may include all devices that registered in the relevant area for a period of time before and after the event. Record of registrations may not be retained, absent a request, for long periods of time, so of course the record before the event (before the request, actually) may be incomplete and so it is preferred that the request be transmitted as soon after the event as possible. In some cases, the period of time that should be used is specified in the device registration capture request.

The device-registration capture, of course, records which devices were located within the vicinity of the event when it took place, and has no or minimal effect on the operation of the network itself. The relevant area for the capture may be a single cell, generally the one in which the event took place, but could also be expanded to include adjacent cells as well. The relevant area may be specified by the investigative authority in the device registration capture request. Naturally, the device-registration capture is stored, in most cases at least initially in a memory storage device associated with the network.

At its simplest, the device registration capture may be stored as a list of directory numbers or mobile ID numbers, or both. In other embodiments, each entry on the device-registration capture may be assigned a unique identifier that is associated with the directory number in a manner that is known only to the network provider or to a limited number of parties. In this way, the device-registration capture data may be provided to and analyzed by others without compromising the privacy of network subscribers. When these anonymous identifiers are used, of course, the network with which they are associated should still be identifiable.

Once the device registration capture has been executed, it is preferred that some type of confirmation be returned to the investigating authority so that otherwise, remedial action (not shown in FIG. 2) can be taken if it appears that for some reason that the device registration capture has not occurred. In the embodiment of FIG. 2, the investigative authority actually receives (step 215) the device registration capture from the network provider. When received, the device registration capture is stored (step 220) in a suitable memory storage device. Note that in other embodiments, the device registration capture will remain stored at the provider network until requested (not shown) by the investigative authority. In one embodiment, the device registration capture stored in step 220 is an aggregate of the captures provided by each available network operator. In other embodiments, however, they may be kept separate and dealt with individually.

As alluded to above, any given area, such as the area in which the event occurs, may be covered by more than one network provider. In this case the investigative authority may request a device-registration data capture from each of them in the same manner (not separately shown).

According to this embodiment of the present invention, when the occurrence of an event is detected, information regarding the event is received (step 225). This information includes not only the exact location of the event, but other characteristics as well. Preferably, some of this information is collected automatically and some is collected from human observers. That information that may be collected automatically includes the location, the date and day of the week and time of the event, and weather information. Automatically collected information may also include information culled from other systems such as electronically-filed police reports. This might include objective data such as the number and general identifying characteristics of any suspects, and whether and what type of weapons were used.

In most implementations, human input will also be collected. In many cases, there are human observations that though highly relevant, defy easy categorization and will simply be collected and stored as comments or notes that can be recalled and reviewed by another investigator. In a preferred embodiment, a request may be sent to any identified investigators to prompt them to supply such information. In any case, when the event-related information has been received, it is stored in an event data base (step 230).

Note that in some embodiments, the receipt of event information (step 225) will coincide with the detection of the event (step 205). In others, they are separate steps and, if the location of the event is not available at detection, then the capture request may have to await the arrival of the event information so that the location for the device registration capture is known.

In this embodiment, the event-related information is then compared to other event-related information already available (step 235). The motivation behind the comparison is to find other events, if any, that are similar in nature to the event that has just been detected. Where objective factors are involved, of course, the comparison can be done at least in part automatically.

In the embodiment of FIG. 2, when the event comparison has been made, an event correlation report is generated (step 240). The event correlation report includes events that are similar in nature, based upon of pre-determined criteria. To refer to the current example, one bank robbery is similar to another bank robbery, at least in that respect. If two events involve late Friday afternoon robberies at branch banks in small towns, these factors make them even more similar. In a preferred embodiment, the event correlation report generated at step 240 includes a correlation factor for each comparison of two or more similar events; the event correlation factor being proportional to the number of objective criteria that the events have in common.

Here again, the comparison of multiple events to determine a correlation factor may benefit from review by a human investigator. In a preferred embodiment, the event correlation report is presented to a human reviewer and, if any input is received, the event correlation factors may be adjusted accordingly. Candidate events are then chosen (step 245).

The event comparison may, of course, find that no other event recorded in the event-information database compares to any meaningful extent with the event currently under evaluation. In other cases, two or more events may have certain characteristics in common, but the event correlation factor is so small as to not warrant further consideration. In these cases, the process may be, but is not necessarily halted at this point. In a preferred embodiment, an event correlation factor threshold is established in advance, and pairs (or other groups) of events not meeting the threshold are at least for the present time ignored.

Regardless of how the candidate events are chosen, however, the device-registration capture for each event candidate event is compared to each of the others (step 250) to see if a match occurs. That is, to determine whether the same electronic device has registered in the area of more than one of the similar events. The implication should be apparent; if, for example, two very similar bank robberies occur, and the same electronic device is shown to be in the area of both events, then there is some probability that the owner of the electronic device was in some way involved.

Of course, the mere presence in the area of a crime—even of two geographically separate but similar crimes—is not proof of guilt. But at the same time facts assembled through execution of the method of the present invention may be able to serve as evidence in a criminal prosecution, or at least have the chance of aiding in the investigation and hopefully the eventual apprehension of the perpetrators.

With this in mind, a device directory report is then prepared (step 255), indicating each electronic device that was in the area when both or all of the similar events occurred. In the circumstance where a given electronic device is present in the area of more than two similar events, the probability that its owner was associated with the events increases. It is therefore preferable that the directory report include a level of detail allowing investigators to consider the number of similar events being considered, and the number of times that a given device was registered in the area of each of them when they occurred.

It is appreciated that, especially in a relatively-densely populated urban area, the number of registered cell phones or other electronic devices on the directory report may be quite large. That does not mean that the directory report will not be useful, but a number of refinements may optionally be employed to filter (step 260) the device directory report to increase its usefulness.

As mentioned above, in many areas in which an event occurs, there are more than one cellular telephone or other network provider present. The present invention is of course more accurately employed when all of the network operators are requested to provide device registration capture information. This, however, may have the effect of increasing rather then decreasing the size of the electronic device directory.

In order to make the electronic device directory more manageable, it may be considered that some of the electronic devices belong to users that live or work in the area. This can be dealt with directly, of course, by requesting, that the device registration captures exclude those devices associated with a billing address in a particular capture area be excluded. This may be done before the capture is provided to the investigative authority, or such information may be provided with the device registration capture so that the investigative authority can perform the operation themselves if it appears desirable to do so.

Similarly, events occurring closer together may have less value when preparing the directory report. For example, referring to FIG. 1, since event A and event B both occurred in cell 104, there is a high probability that the device registration reports associated with those events will contain a large number of matches, representing persons who for one reason or another may be frequently present in that area. Therefore in some embodiments, even if events A and B have a high event correlation factor, their value may be limited. In some embodiments, of course, the event correlation factor for such events can be reduced accordingly.

The situation is different with events C and D, which are geographically separated. In that case, an electronic device appearing on the device registration captures associated with those events are more likely to be of interest. In some embodiments, the event correlation factor between events C and D may accordingly be raised. Events A and D are even more geographically separated that events C and D, and so a proportionately higher adjustment may be made. Here, it is noted that the events A through D are all only within a few cells of each other in FIG. 1. This is a limitation of the illustration itself, however and in actual practice the geographical separation between correlative events may be much greater.

A location filter may also be applied by requesting device registration captures on a periodic basis after the event. In this way, electronic devices that appear to be frequently or almost always in a particular area may be, but is not necessarily ignored for the preparation of a particular electronic device directory. (This is not to say that he device eliminated from consideration does not belong to a person of interest, only that its registration in the area may be of little help.) This filter may be further refined if regular presence at a particular time of day was regular for a particular device; this particular time may or may not correlate with the time of the event. This may also aid in analyzing geographically-close events by revealing that a device present for the occurrences of both events A and B is nevertheless otherwise not usually present in that area. In a preferred embodiment, device registration captures are regularly requested even when no event occurs to establish a baseline of electronic devices that are ordinarily in the area. Naturally, there may be in many cases a practical limit to the appropriate number or frequency of such requests, but it is expected that issue will be resolved based on local conditions.

In some instances, aside from an event database a particular investigative authority may also store identifying information relating to certain persons, for example known sex offenders. In such cases even the cell phone numbers or similar information may also be known about a particular person. Conversely, there may be certain cell phone or similar numbers that have for one reason or another been associated with a particular type of event, but for one reason or another the identify of the user is unknown. In either case the device registration capture associated with an event may be filtered to determine whether any persons or identifying numbers of interest are present. Where the device registration capture has been provided anonymously, the network provider may be requested to ascertain this condition.

As implied above, there may be certain legal requirements that have to be fulfilled in order to obtain some or all of the requested data. This is the reason for providing anonymous device registration captures as mentioned above. In that case, the appearance of a device on an electronic device directory that is the result of several highly correlative events may itself form the basis for, for example, a search warrant permitting the disclosure of more revealing information.

Of course, the device directory report may not prove helpful at all to the investigation. Although usually more precise and reliable than, for example, video surveillance, the present invention does depend on the relevant electronic devices being powered up and carried into the area by a person associated with the event. In this day in age, however, that is not an unusual occurrence, and not infrequently the devices are used in the commission of a crime. Like any such investigatory tool, its operation may be frustrated by sophisticated individuals who take deliberate steps to avoid it, but such persons do not participate in every criminal act or related event, and often fail in their efforts to avoid detection.

The process described above is only one embodiment of the present invention, and other embodiments may be used as well. In addition, it should be noted that he operations of method 200 may be performed in any logically-consistent sequence in addition to the one illustrated in FIG. 2. In some embodiments, as described above, some operations may be added or, in some cases, omitted without departing from the spirit of the invention.

Figure 3:
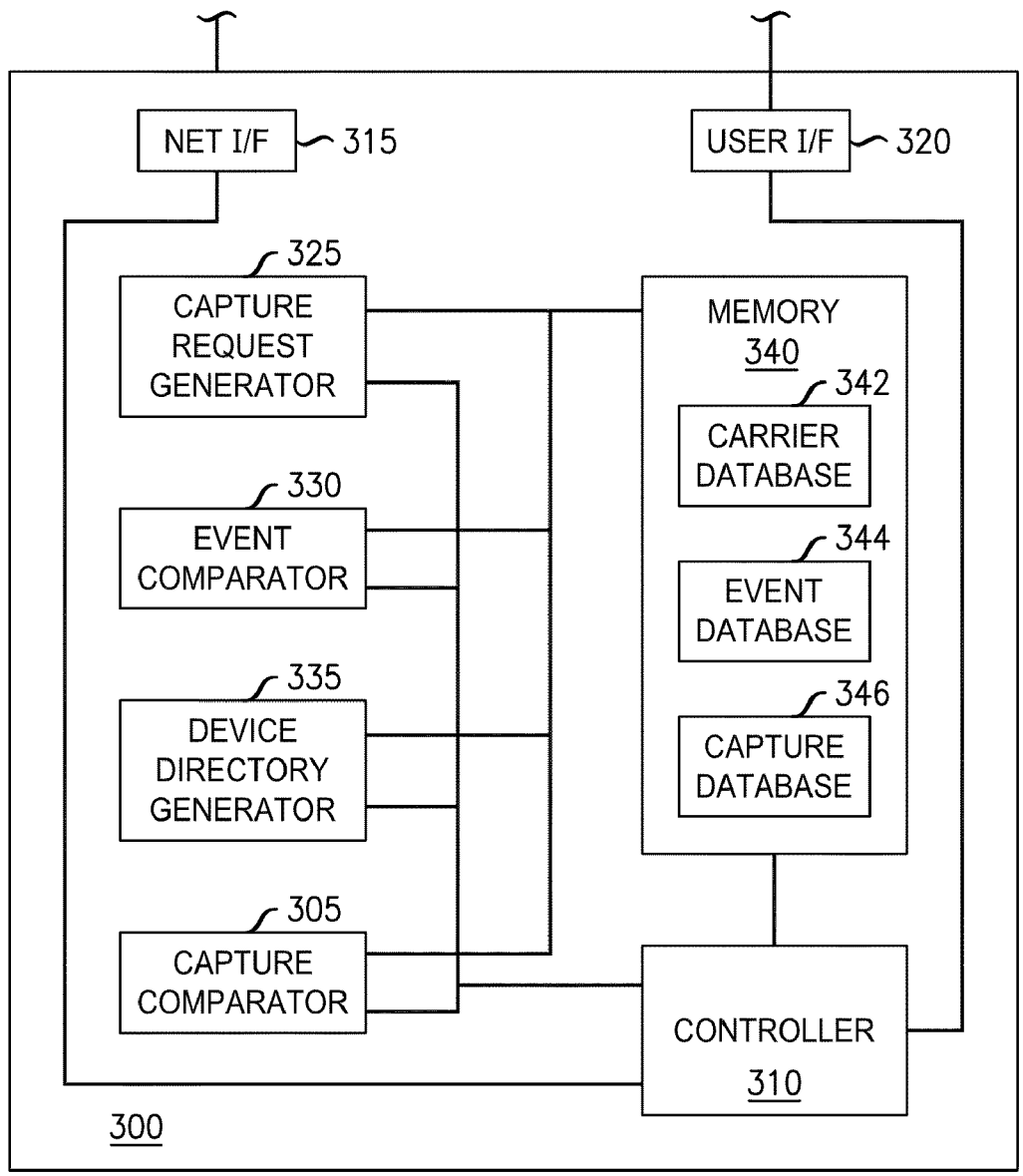
FIG. 3 is an application server configured according to an embodiment of the present invention.

The present invention may be implemented in a number of different ways. In one preferred embodiment, the present invention is implemented in the software-controlled hardware of an investigation authority apparatus, for example the one shown in FIG. 3. FIG. 3 is an application server 300 configured according to an embodiment of the present invention. In this embodiment, application server 300 includes a device registration capture request generator 325 for generating one or more device registration capture requests when an event is detected by server 300. Event comparator 330 compares characteristics associated with the detected event to characteristics of past events to determine the degree to which they are similar. It may also be used to compare events that have occurred in the past and are sent to the application server 300 only for analysis purposes, that is, not for the purpose of initiating device registration capture requests. Device directory generator prepares an electronic device directory for reporting the identity of selected electronic devices that have been found in the area of similar events by capture comparator 305.

A network interface module 315 allows the application server 300 to communicate with the various network operators to communicate requests and receive capture information. A user interface module 320 facilitates providing notices and reports to the investigative authority users and receive commends. Event alerts and information may arrive via either network interface 315 or user interface 320, or both.

Each of these components operated under the control of controller 310, which also communicates with memory storage device 340 where the procedures for executing the processes of the present invention may be stored. In this embodiment, memory 340 also includes a carrier database 342 associating various network providers with their area of coverage, an event database 344 for storing information relating to various past events, and capture database 346 for storing any device registration capture information received form the network operators.

Although shown together in application server 300 in FIG. 3, the various components described above may in other embodiments (not shown) be distributed to more than one physical location. In some implementations, other components may be present or, in some cases, omitted or combined with other components.

In this way the present invention provides a useful tool for investigatory authorities to gather evidence and further their investigations by producing electronic device directories reporting when selected electronic devices were present in the area of one or more similar events at or near the time when they occurred.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of creating an electronic device directory for investigating an event, comprising:
   detecting, at an application server, an occurrence of a first event;
   comparing, in the application server, a first device registration capture associated with the first event with at least one device registration capture associated with a previous event to identify common electronic device registrations; and
   generating an electronic device directory including at least selected ones of the common electronic device registrations.

2. The method according to claim 1, further comprising storing a record of characteristics associated with the first event in a memory storage device.

3. The method according to claim 2, wherein the memory storage device is located in the application server.

4. The method according to claim 1, wherein the device registration captures include only those electronic devices registered in a limited geographic area.

5. The method according to claim 4, wherein the device registration captures are generated in a cellular telephone network and the limited geographic area includes a cell in which the associated event occurred.

6. The method according to claim 1, further comprising generating at least one device registration capture request.

7. The method according to claim 6, wherein the at least one device capture request is generated in response to detecting the occurrence of the first event.

8. The method according to claim 6, wherein the at least one device capture request specifies a geographic area for which the device registration capture is requested.

9. The method according to claim 8, further comprising generating a plurality of device registration requests, spaced apart in time, for determining which electronic devices are frequently registered in the geographic area.

10. The method according to claim 1, further comprising comparing, in the application server, characteristics associated with an event with characteristics associated with one or more other events to select candidates for comparing device registration captures.

11. An apparatus for creating an electronic device directory, comprising:

a device registration capture request generator for generating a request for transmission to a communication network to store identities of electronic devices registered with the network;

an electronic device directory generator for generating a directory of electronic devices found to have been registered in an area of each of a plurality of events and at or near time when the events occurred;

a controller operatively connected to the device registration capture request generator and the electronic device directory generator for supervising operation thereof; and a memory storage device in communication with the controller for storing operating instructions and data.

12. The apparatus of claim 11, further comprising a device registration capture comparator for comparing two or more device registration captures to determine which electronic devices, if any, are reported as being registered on a plurality of the device registration captures.

13. The apparatus of claim 12, wherein the electronic device directory generator uses results of the device registration capture comparison in generating the electronic device directory.

14. The apparatus of claim 11 further comprising an event comparator to compare characteristics associated with one event with characteristics associates with at least one other event and to select candidate events for device registration capture comparison.

* * * * *